(12) United States Patent
Liu et al.

(10) Patent No.: US 11,443,278 B2
(45) Date of Patent: Sep. 13, 2022

(54) METHOD, APPARATUS, AND DEVICE FOR GENERATING AND UPDATING BLOCKCHAIN WAREHOUSE RECEIPT

(71) Applicant: Alipay (Hangzhou) information Technology Co., Ltd., Zhejiang (CN)

(72) Inventors: Wenhui Liu, Zhejiang (CN); Yujun Peng, Zhejiang (CN); Erfeng Yan, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/365,513

(22) Filed: Jul. 1, 2021

(65) Prior Publication Data
US 2022/0083972 A1 Mar. 17, 2022

(30) Foreign Application Priority Data
Sep. 15, 2020 (CN) .......................... 202010969277.0

(51) Int. Cl.
*G06Q 10/08* (2012.01)
*H04L 9/40* (2022.01)

(52) U.S. Cl.
CPC ..... *G06Q 10/0875* (2013.01); *H04L 63/0435* (2013.01); *G06Q 2220/00* (2013.01)

(58) Field of Classification Search
CPC ........... G06Q 10/0875; G06Q 2220/00; G06Q 10/0838; G06Q 40/04; G06Q 20/06; G06Q 30/0185; G06Q 20/0655; H04L 63/0435
See application file for complete search history.

(56) References Cited

U.S. PATENT DOCUMENTS

| | | | | |
|---|---|---|---|---|
| 11,195,357 | B2* | 12/2021 | Soeda | ........................ B60P 7/13 |
| 2016/0350728 | A1* | 12/2016 | Melika | .............. G06Q 20/3829 |
| 2017/0178072 | A1* | 6/2017 | Poornachandran | ......................... G06Q 20/3276 |
| 2018/0189753 | A1* | 7/2018 | Konda | .................... G06Q 20/06 |
| 2018/0268506 | A1* | 9/2018 | Wodetzki | ............. G06V 30/413 |
| 2018/0343266 | A1* | 11/2018 | Lotter | ................... H04W 4/021 |
| 2019/0228409 | A1* | 7/2019 | Madisetti | .............. H04L 9/0637 |
| 2019/0311352 | A1* | 10/2019 | Lui | ......................... G06Q 20/06 |
| 2019/0340623 | A1* | 11/2019 | Rivkind | .............. G06F 16/2365 |
| 2019/0361917 | A1* | 11/2019 | Tran | ..................... G06F 21/602 |

(Continued)

FOREIGN PATENT DOCUMENTS

| | | |
|---|---|---|
| CN | 110910066 A | 3/2020 |
| CN | 111429057 A | 7/2020 |
| CN | 111461623 A | 7/2020 |

OTHER PUBLICATIONS

First Office Action of Chinese Application No. 202010969277.0, dated Nov. 23, 2020.

*Primary Examiner* — Olusegun Goyea
(74) *Attorney, Agent, or Firm* — Finnegan, Henderson, Farabow, Garrett & Dunner, LLP

(57) ABSTRACT

A method for generating a blockchain warehouse receipt includes: obtaining item registration information provided by a first user; generating a blockchain warehouse receipt including basic type fields according to the item registration information by invoking a first smart contract, the basic type fields including a warehouse receipt type field, a warehouse receipt ID field, a generation time field, a state field, a category field, a property owner field, a quantity field, and a weight field; and storing the blockchain warehouse receipt in a blockchain network.

21 Claims, 8 Drawing Sheets

(56) References Cited

U.S. PATENT DOCUMENTS

2020/0020187 A1\* 1/2020 Soeda ................ G06Q 10/0838
2020/0044857 A1\* 2/2020 Snow ...................... G06F 21/53

\* cited by examiner

| Field | Required or not | Parameter type | Remark |
|---|---|---|---|
| Warehouse receipt type | T | - | My warehouse receipt type |
| Warehouse receipt ID | T | Automatic generation | Warehouse receipt generation time |
| Generation time | T | Date | Latest state of the warehouse receipt |
| Update time | T | Date | Update time |
| State | T | Read database | Read the warehouse receipt state |
| Category | T | Drop-down selection | Two-level drop-down selection, divided into major and minor categories, and maintained by the user |
| Property owner | T | Fill in the blank | Read a current owner party of the warehouse receipt |
| Quantity | T | Fill in the blank in unit | |
| Weight | T | Fill in the blank in unit | |

FIG. 2

Basic information

| | | |
|---|---|---|
| Warehouse receipt ID: | Generation time: | Update time: |
| State: | Consortium name: | Warehousing party: |
| Inventory party: | Property owner: | |

Goods information

| | | |
|---|---|---|
| Category: | Specification: | Quantity: |
| Weight: | | |

Logistics information

| | | |
|---|---|---|
| Transport mode: | Vehicle and vessel number: | Driver name: |
| Mobile phone number of driver: | Driver ID: | Arrival time: |

FIG. 3

METHOD, APPARATUS, AND DEVICE FOR GENERATING AND UPDATING BLOCKCHAIN WAREHOUSE RECEIPT

CROSS-REFERENCE TO RELATED APPLICATIONS

The present application is based upon and claims priority to Chinese Patent Application No. 202010969277.0, filed on Sep. 15, 2020, the entire content of which is incorporated herein by reference.

TECHNICAL FIELD

This application relates to the field of blockchain technologies, and in particular, to a method, an apparatus, and a device for generating and updating a blockchain warehouse receipt.

BACKGROUND

Some bulk commodity industries have too many circulation links and low circulation efficiency, resulting in high inventories and severe pressure on funds. In addition, some commodities not suitable for movement, such as antiques, also face inconvenience of offline transactions. Therefore, online transactions of resources completed without moving the resources, such as commodities, need to be provided, to improve operation efficiency and a liquidity of the resources.

SUMMARY

In a first aspect of embodiment of the present specification, a method for generating a blockchain warehouse receipt includes: obtaining item registration information provided by a first user; generating a blockchain warehouse receipt including basic type fields according to the item registration information by invoking a first smart contract, the basic type fields including a warehouse receipt type field, a warehouse receipt ID field, a generation time field, a state field, a category field, a property owner field, a quantity field, and a weight field; and storing the blockchain warehouse receipt in a blockchain network.

In a second aspect of embodiment of the present specification, a method for updating a blockchain warehouse receipt includes: obtaining a transfer application for the blockchain warehouse receipt; and invoking a second smart contract according to the transfer application to perform: determining a transfer warehouse receipt ID, transferor information, and transferee information; querying a blockchain network for property owner information corresponding to the transfer warehouse receipt ID; sending the transfer application to a transferee corresponding to the transferee information when the property owner information is consistent with the transferor information; changing property owner information corresponding to a property owner field on the blockchain warehouse receipt to the transferee information after confirmation information from the transferee is received; and storing an updated blockchain warehouse receipt in the blockchain network.

In a third aspect of embodiment of the present specification, a device includes: a processor; and a memory storing instructions executable by the processor, wherein the processor is configured to: obtain item registration information provided by a first user; generate a blockchain warehouse receipt including basic type fields according to the item registration information by invoking a first smart contract, the basic type fields including a warehouse receipt type field, a warehouse receipt ID field, a generation time field, a state field, a category field, a property owner field, a quantity field, and a weight field; and store the blockchain warehouse receipt in a blockchain network.

Embodiments of this specification may achieve the following beneficial effects: by using a data dictionary tool of a digital property rights platform, standard fields of a blockchain warehouse receipt are defined combined with accumulated experience in bulk commodity industries, making it convenient for a user to quickly build a blockchain warehouse receipt system of a category, and realizing standardized circulation of a warehouse receipt. Accordingly, physical assets of bulk commodities can be converted into digital assets that are safe, reliable, and have good liquidity, ownership of property rights is clarified, and a credible asset system with a certificate such as a "blockchain warehouse receipt" as a carrier is constructed.

BRIEF DESCRIPTION OF THE DRAWINGS

The accompanying drawings, which are incorporated in and constitute a part of this specification, illustrate embodiments and, together with the description, serve to explain the principles of the specification.

FIG. 2 is a schematic diagram of initialization parameters of a blockchain warehouse receipt according to an embodiment.

FIG. 3 is a schematic diagram of standard parameters of blockchain warehouse receipt information according to an embodiment.

DETAILED DESCRIPTION

Figure 1:
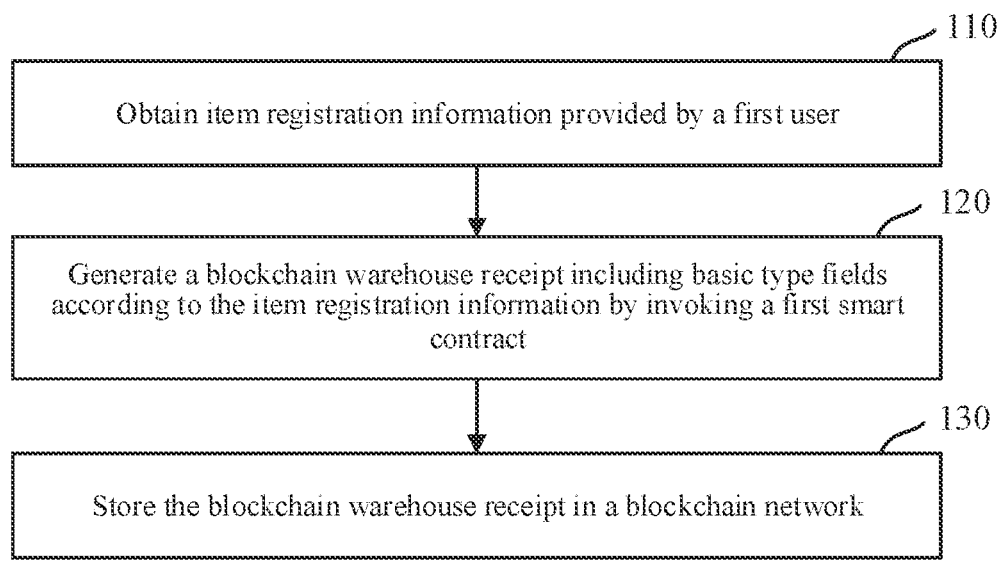
FIG. 1 is a flowchart of a method for generating a blockchain warehouse receipt according to an embodiment.

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples but not all of the embodiments consistent with this specification.

Bulk commodities refer to material commodities bought and sold in bulk that may enter a circulation field but not a retail link, have commodity attributes, and are used for industrial and agricultural production and consumption. In the financial investment market, bulk commodities refer to commodities that are homogenized, tradable, and widely used as industrial basic raw materials, for example, crude oil, non-ferrous metals, steel, agricultural products, iron ore, and coal. Bulk commodities include three categories, namely, energy commodities, basic raw materials, and agricultural and sideline products.

Bulk commodities are commonly characterized in that supply and demand are large, but there are too many circulation links and circulation efficiency is low, resulting in high inventories and severe pressure on funds. Therefore, there is a need to provide a method of trading or transferring without moving bulk commodities, to improve liquidity of funds.

In view of the foregoing situation, the present specification provides a blockchain digital property rights platform, to convert physical items of bulk commodities and the like into digital assets that are safe, reliable, and have good liquidity, clarify ownership of property rights, and construct a credible asset system with a certificate such as a "blockchain warehouse receipt" as a carrier. Items that not suitable for movement are traded in the form of digital items, thereby increasing the circulation rate of items.

In addition, the blockchain digital property rights platform according to this application may manage all physical assets and digital assets. The physical assets may include: real property, physical movable property, or precious metals. The digital assets may include: bills, bonds, certificates of deposit, warehouse receipts, bills of lading, shares, equity, trademark rights, patent rights, and copyrights.

In addition, the blockchain digital property rights platform provided in the present specification can have the following characteristics: 1. digitized and astatized warehouse receipts: through industry standard fields plus intelligent control of goods, physical assets and digital assets are mapped and anchored to realize on-chain asset issuance; 2. transparentized on-chain circulation links: automatic circulation of a transaction is driven by using a smart contact of a blockchain, and each change of a warehouse receipt is recorded while ensuring credibility and traceability of ownership of the warehouse receipt; and 3. consortium ecological construction: the conventional warehouse receipt ecology and operational efficiency are improved through an access of items such as supervision, risk control, and disposal.

The blockchain technology is a decentralized storage and computing technology that generates durable and unmodifiable records by superimposing encrypted data blocks in chronological order, and stores the records in each blockchain node device of a blockchain, achieving distributed data storage in a decentralized manner Each data block contains system data within a particular time, and a data fingerprint is generated to verify validity of information thereof and link to a next data block. Therefore, the blockchain technology has technical advantages in terms of data tamper resistance, transparency, and decentralization, and the blockchain technology has been applied to many industries and fields.

The smart contract refers to a set of commitments defined in a digital form, including agreements on which contract participants may execute the commitments. A smart contract may be a computer program that performs specific functions in a blockchain node device. A smart contract may record transactions and share transaction data, so that data stored in any node in a blockchain is to be shared to all nodes in the blockchain, so that other nodes may all obtain data content. In this way, data sharing and transparency in the blockchain can be effectively guaranteed. In addition, because the data stored in the blockchain cannot be tampered with, data tamper resistance can be further guaranteed in the blockchain. Because the blockchain pertains to a peer-to-peer network, when a user needs to obtain data from the blockchain, the user may visit any node in the blockchain to obtain transaction data.

FIG. 1 is a flowchart of a method for generating a blockchain warehouse receipt according to an embodiment of this specification. For example, the method may be implemented as a program or an application client loaded on an application server. Also for example, the method may be performed by a node on a blockchain. As shown in FIG. 1, the method may include the following steps.

Step 110: Obtain item registration information provided by a first user.

Items may include physical assets and digital assets. The physical assets may include: real property, physical movable property (for example, bulk commodities, and cars), artworks, or precious metals. The digital assets may include: bills, bonds, certificates of deposit, warehouse receipts, bills of lading, shares, equity, trademark rights, patent rights, and copyrights.

An item owner may register the items on a platform and submit an item registration application. When submitting the item registration application, the item owner may provide some basic information, such as category, specification, quantity, warehousing party information, and property owner information. The item registration information may be determined based on such information. The item registration information may further include other information related to the items.

The first user may be the item owner, or an agent or an agency of the item owner. The item registration information may be obtained by the first user by filling in blanks or by selecting.

In addition, the item registration information may be obtained by obtaining information stored on an on-chain node or an off-chain node by using a smart contract, or may be filled in by the user on an offline platform of the on-chain node, and then the off-chain node sends the registration information filled in by the user to the blockchain. The on-chain node may be a device of the item owner or the agency of the item owner.

The item registration information may include warehouse receipt type information, a warehouse receipt ID, state information, category information, property owner information, quantity information, and weight information.

Step 120: Generate a blockchain warehouse receipt including basic type fields according to the item registration information by invoking a first smart contract, the basic type fields including at least one of a warehouse receipt type field, a warehouse receipt ID field, a generation time field, a state field, a category field, a property owner field, a quantity field, and a weight field.

The blockchain warehouse receipt includes the basic type fields, and a location corresponding to each field may display information related to the field. For example, the warehouse receipt ID field displays an ID of the blockchain warehouse receipt. The ID may be randomly generated when the blockchain warehouse receipt is generated, or may be generated according to a preset rule, for example, obtained after some processing according to some information in the blockchain warehouse receipt.

A location corresponding to the warehouse receipt type field may display type information of the blockchain warehouse receipt, and the warehouse receipt may be classified according to requirements.

A location corresponding to the generation time field may display generation time information of the blockchain warehouse receipt.

A location corresponding to the state field may display state information of the blockchain warehouse receipt, for example, whether the blockchain warehouse receipt is in a pledge state.

A location corresponding to the category field may display category or specification information of the item.

A location corresponding to the property owner field may display information about the owner, owner party, or proprietor.

A location corresponding to the quantity field may display information about a quantity of items.

A location corresponding to the weight field may display weight information of the item.

Step 130: Store the blockchain warehouse receipt in a blockchain network.

In an embodiment, the blockchain warehouse receipt may further include at least one of a logistics type field, a contract type field, a warehouse location field, and a warehouse replenishment field.

In an embodiment, the logistics type field may include at least one of a transport mode field, a vehicle and vessel number field, a driver name field, a driver ID field, an ID number field, and an arrival time field.

To improve credibility of a digital property trading platform based on blockchain warehouse receipts, before the generating the blockchain warehouse receipt according to the item registration information, the method may further include: performing authenticity verification on the item registration information; and the generating the blockchain warehouse receipt according to the item registration information may include: generating the blockchain warehouse receipt according to the item registration information after the authenticity verification succeeds.

When submitting the item registration information, the first user may provide evidence to prove that the provided information is true, for example, the user may upload a purchase contract of the item, a storage proof of the item, or the like.

The authenticity verification may be proof of the owner of the item, or may be proof of the quantity of the item, or the like.

For example, warehousing party information is third-party institution information used for determining whether the item exists. The authenticity verification performed on the item registration information may be confirmed according to information provided by the warehousing party. Therefore, the warehousing party information may be further included in the blockchain warehouse receipt. In addition, the blockchain warehouse receipt may be further provided with at least one of a logistics type field, a contract type field, a warehouse location field, and a warehouse replenishment field.

A location corresponding to the warehouse replenishment field may display warehouse replenishment information. The warehouse replenishment information may be, for example, whether to replenish a warehouse, and a warehouse receipt ID of the warehouse to be replenished.

The contract type field may include at least one of a purchase contract field, a purchase invoice field, and a commodity inspection report field. A display location corresponding to the purchase contract field is used to display related information of the purchase contract, which may be displayed in the form of a contract name, a number, or an attachment. A display location corresponding to the purchase invoice field is used to display related information of the purchase invoice, which may be a number or the like of the purchase invoice. A display location corresponding to the commodity inspection report field is used to display related information of the commodity inspection report.

In an embodiment, the basic type fields may further include at least one of an inventory party field and a warehousing party field.

In an embodiment, the performing authenticity verification on the item registration information may include: obtaining inventory proof information uploaded by the first user; determining inventory party information according to the inventory proof information; determining basic inventory information according to the inventory proof information; and determining whether the basic inventory information is consistent with basic item information, and whether the inventory party information is consistent with the property owner information, the basic item information including the category information, the weight information, and the quantity information, and the basic inventory information including inventory category information, inventory weight information, and inventory quantity information.

When the authenticity verification is performed on the item registration information, some proofs, such as an inventory proof, provided by the owner during registration may be used for the verification. The inventory proof is a proof used to prove a storage location and an inventory party of the item. The owner of the item may upload the inventory proof when submitting the item registration application. In this case, the inventory proof information obtained by a device corresponding to the digital property rights platform is image information of the inventory proof. To determine the inventory party information and the basic inventory information according to the inventory proof information, text recognition may be used to identify the inventory party information and the basic inventory information from the image information.

The inventory party may be an actor who delivers the item to the warehousing party for storage, and the inventory party may be a natural person, a legal person, or various organizations or institutions. Correspondingly, the inventory party information may be a name, identification information, a company name, an institution name, an institution code, and the like.

The basic inventory information may include: an inventory category, an inventory specification, an inventory quantity, an inventory weight, or the like. The inventory category may be a category of the item, such as oil, steel, and an artwork, or may be a character of the item, such as purity, and purity of oil. The specification may be a model, a weight, a size, and the like, for example, a model of oil being 92 #or 95 #, a size of a painting, or a height of an antique vase. The inventory quantity may be understood as a quantity corresponding to the foregoing inventory specification, for example, how many tons of oil, or how many paintings or antiques.

In an embodiment, the determining basic inventory information according to the inventory proof information may include: identifying inventory location information included in the inventory proof information; determining a video surveillance device corresponding to the inventory location information; retrieving video information acquired by the video surveillance device; and determining the basic inventory information according to the video information.

To improve authenticity and credibility of the digital property rights platform, the digital property rights platform provided in the embodiments of this specification further provides an Internet of Things device, e.g., a video surveillance device, which is configured to monitor the item in real time. For example, a storage situation of the item may be monitored, and a transmission process of the item may be also monitored. A surveillance video acquired by the video surveillance device may be directly uploaded to the blockchain network by setting a smart contract, and stored in a block in the form of a hash value, such that the surveillance video may not be modified. In addition, the video surveillance device may monitor the state of the item in real time. For video surveillance information, the smart contract may be used to define which users have permission to invoke the video surveillance information, while the other users cannot invoke the video surveillance information. The users who can invoke the video surveillance information of the item are the related parties of the item, such as the property owner, the warehousing party, or the transferee.

Based on an intelligent surveillance device, when the item registration information is verified, an inventory location of the item may be registered, and then the item may be monitored by the surveillance device. The inventory proof may include the inventory location information. According to a mapping relationship between the inventory location and the video surveillance device, the corresponding video surveillance device is searched, and then the video information acquired by the video surveillance device is invoked to determine the basic inventory information.

The inventory location information may include a warehouse and a warehouse location. It should be noted that one item may correspond to at least one video surveillance device. However, when there are a large number of items, a plurality of video surveillance devices are often needed for monitoring at the same time.

In an embodiment, the blockchain warehouse receipt further includes traceability information, the traceability information is used for recording use process information of the blockchain warehouse receipt, and the use process information includes at least one of generation, cancellation, pledge, and transfer. The traceability information may be displayed on the right side of the blockchain warehouse receipt.

In an embodiment, the traceability information may be displayed in a barcode, such as a two-dimensional code or the like.

According to the method of FIG. 1, standard fields of a blockchain warehouse receipt are defined, making it convenient for a user to quickly build a blockchain warehouse receipt system of a category, and realizing standardized circulation of a warehouse receipt.

It should be understood that an order of some of the steps of the method described in embodiments of this specification may be exchanged according to actual requirements, or some of the steps may be omitted or deleted.

FIG. 2 is a schematic diagram of initialization parameters of a blockchain warehouse receipt according to an embodiment of this specification. The warehouse receipt information may include: a warehouse receipt type, a warehouse receipt ID, a generation time, an update time, a state, a category, a property owner, a quantity, and a weight.

The warehouse receipt ID may be automatically generated, the generation time and the update time are automatically updated according to a state change of the warehouse receipt, the state is filled in by reading a database, the property owner is filled in by reading a current owner party of the warehouse receipt, and the category, the quantity, and the weight may be maintained by the user, that is, selected by dropping down a menu, or filled in by the user.

The foregoing parameters in FIG. 2 are an example set of the blockchain warehouse receipt information. The initialization parameters of the blockchain warehouse receipt are defined as necessary fields of the blockchain warehouse receipt system.

FIG. 3 is a schematic diagram of standard parameters of blockchain warehouse receipt information according to an embodiment of this specification. The warehouse receipt information includes: a warehouse receipt ID, a generation time, an update time, an item state, inventory party information, warehousing party information, property owner information, a character, a specification, a quantity, a weight, a transport mode, a vehicle and vessel number, a driver name, a mobile phone number of the driver, identity information of the driver, and an arrival time.

The warehouse receipt information may further include some uploaded attachment information, for example, a purchase contract, a purchase invoice, or a commodity inspection report.

In an embodiment, the warehouse receipt information may further include warehouse location information, such as a warehouse and a warehouse location, which may be provided by the user.

In an embodiment, the warehouse receipt information may further include warehouse replenishment information, for example, whether to replenish a warehouse and a warehouse receipt ID of the warehouse to be replenished, which may be selected or filled in by the user.

In this embodiment, the standard fields of the blockchain warehouse receipt are defined as a default template of the system, to support the definition of blockchain warehouse receipts of most customers.

Figure 4:
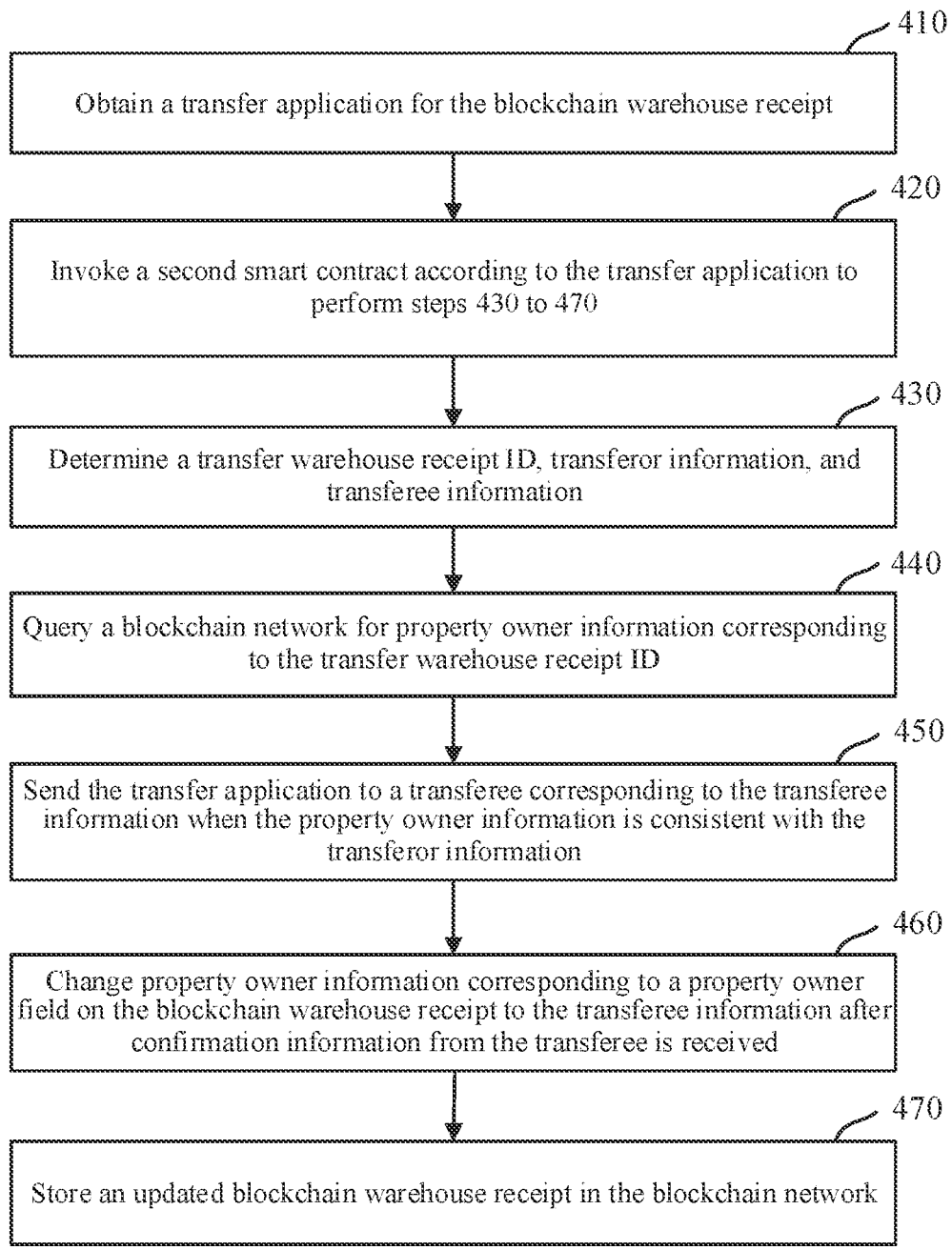
FIG. 4 is a flowchart of a method for updating a blockchain warehouse receipt according to an embodiment.

FIG. 4 is a flowchart of a method for updating a blockchain warehouse receipt according to an embodiment of this specification. For example, the method may be implemented as a program or an application client loaded on an application server. Also for example, the method may be executed by a node on a blockchain.

Figure 5:
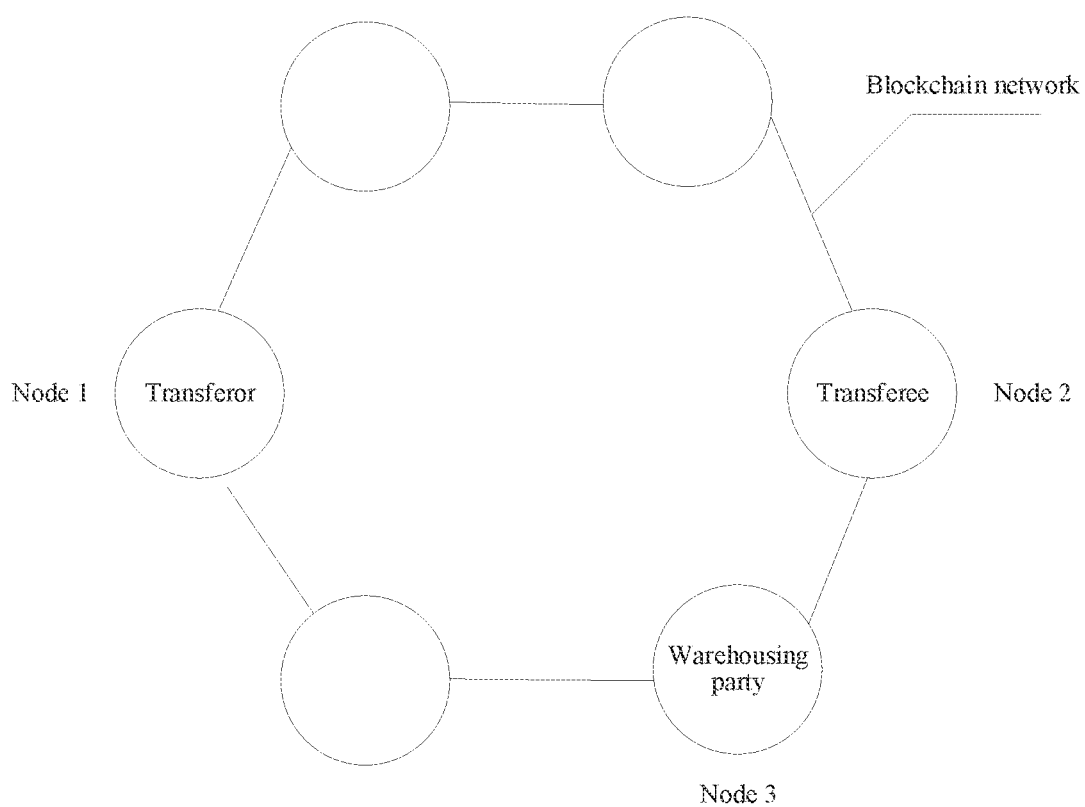
FIG. 5 is a schematic diagram of an application scenario of a method for updating a blockchain warehouse receipt according to an embodiment.

The update of the blockchain warehouse receipt may be a change of a property owner caused by an item transfer. FIG. 5 is a schematic diagram of an application scenario of an item transfer method according to an embodiment of this specification.

As shown in FIG. 5, a plurality of blockchain warehouse receipts are stored on a blockchain network, and each blockchain warehouse receipt uniquely corresponds to an item. The blockchain network includes a plurality of nodes, where a node 1 is a device corresponding to a transferor, a node 2 is a device corresponding to a transferee, and a node 3 is a device corresponding to a warehousing party. The node 1 may initiate an item transfer operation, trigger a smart contract in the blockchain, and then complete a transfer operation of an item according to a process specified by the smart contract. Whether a property owner of the item is consistent with the transferor of the item needs to be determined. If the property owner of the item is consistent with the transferor of the item, the item transfer operation is forwarded to the transferee of the item, for the transferee to confirm whether the item transfer operation exists and is correct. If the transferee confirms that there is no error, it is determined that the transfer of the item is established. The property owner of the item in the blockchain network is then changed to the transferee, and digital property rights are generated, to prove that the transfer of the item is completed and the item pertains to the transferee. Then, the changed information is stored in the blockchain network for the nodes in the blockchain network to query.

When the node 1 initiates the item transfer operation, some document information may be uploaded as a proof, for example, a sales contract, and a warehouse contract. Whether information about the inventory party is the same as that of the transferor may be determined according to the warehouse contract.

In addition, when initiating the transfer operation, the transferor may change the property owner information after confirming of the warehousing party. Confirmation information of the warehousing party may include confirmation information of a storage location of the item, and may further include confirmation information of a storage party of the item.

Intelligent physical asset monitoring may achieve the following effects: 1. Support a secure and reliable access of a variety of Internet of Things devices; 2. Perform device authentication, encrypted real-time transmission, and information chaining, to ensure data credibility from the source; 3. Combined with AI to perform intelligent analysis, and realize intelligent monitoring and early warning of cases such as warehouse transfer and abnormal intrusion, to ensure security; 4. Support multi-category physical objects and intelligent checking; 5. Multi-dimensional data increases credibility of information, and transaction system data information such as enterprise item planning, order management system, warehouse management system, and transport management system is chained to achieve transaction credibility; 6. Warehousing Internet of Things device monitors real-time chaining of data information, realizing generation and circulation of physical credible warehouse receipts on a credible consortium chain, witnessed by a plurality of parties, and assets being visible in an entire link.

Referring to FIG. 4, the method for updating a blockchain warehouse receipt may include the following steps:

Step 410: Obtain a transfer application for the blockchain warehouse receipt.

The transfer application may be an item transfer operation initiated by a device corresponding to the property owner of the item, or may be item transfer information generated by the item transfer operation, where the device is a registered node of the blockchain network.

Step 420: Invoke a second smart contract according to the transfer application to perform steps 430 to 470.

Step 430: Determine a transfer warehouse receipt ID, transferor information, and transferee information.

The transfer application may include the item to be transferred and the transferee information. The item to be transferred may be calibrated with a unique identifier of the item, such as the warehouse receipt ID. The transferor information may be determined according to the initiator of the item transfer operation. In most cases, the initiator of the item transfer operation is the transferor of the item.

Step 440: Query a blockchain network for property owner information corresponding to the transfer warehouse receipt ID.

Under no special cases, a property owner of the item can initiate the transfer operation. To verify whether the initiator of the item transfer is the property owner of the item, the property owner information of the transferred item may be determined first. The property owner information of the item is stored in the blockchain network and may be queried when needed.

Information stored in the blockchain network is identified by a warehouse receipt ID. The warehouse receipt ID is used to search in the blockchain network, to query related information of an item corresponding to the warehouse receipt ID, for example, basic information, a category, a quantity, or a weight of the item, and the information may include property owner information and warehousing party information of the item.

Step 450: Send the transfer application to a transferee corresponding to the transferee information when the property owner information is consistent with the transferor information.

When the property owner information of the transferred items is queried from the blockchain network, the property owner information is compared with the transferor information, to check whether the property owner information is consistent with the transferor information. The transferor information may be information of the initiator of the item transfer operation. If the property owner information is consistent with the transferor information consistent, the item transfer information needs to be sent to the transferee for confirmation.

Step 460: Change property owner information corresponding to a property owner field on the blockchain warehouse receipt to the transferee information after confirmation information from the transferee is received.

If the transferee confirms the item transfer information, it indicates that the transferor and transferee have reached a consensus that the transfer operation is true and valid. Therefore, the property owner information of the item may be changed to the transferee information.

Step 470: Store an updated blockchain warehouse receipt in the blockchain network.

The blockchain warehouse receipt of which the property owner information is changed is stored in the blockchain network. The property owner information may be changed directly in the blockchain warehouse receipt stored in the blockchain network, and the change record may be stored in a block.

According to the method in FIG. 4, the property owner of the item initiates the item transfer application on the blockchain network, and after the transferee of the item performs confirmation, the property owner information of the item on the blockchain network is changed to the transferee information, to complete the transfer of the item. In this method, online transaction of the item is completed without moving the item, to improve liquidity of bulk items and convenience of transaction.

In addition, the property owner information of the item is stored in the blockchain network, so that the ownership of the item can be proved by querying the property owner information of the item in the blockchain network. Moreover, the transaction is conducted by using the blockchain network, which can ensure security and credibility of the transaction.

In an embodiment, before the sending the transfer application to the transferee corresponding to the transferee information, the method may further include: querying the blockchain network for warehousing party information corresponding to the transfer warehouse receipt ID; and sending the transfer application to a warehousing party corresponding to the warehousing party information; and the changing property owner information corresponding to the property owner field on the blockchain warehouse receipt to the transferee information may include: changing the property owner information corresponding to the property owner field on the blockchain warehouse receipt to the transferee information after confirmation information from the warehousing party is received, the confirmation information being confirmation information of a storage location of an item corresponding to the transfer warehouse receipt ID.

In some embodiments, if an item is a bulk commodity or an industrial and agricultural product, the item often needs to be stored, which may involve a warehousing party. The warehousing party is a third-party institution or a restricted legal person that stores and keeps the item. The blockchain network may further store the warehousing party information and the storage location information of the item.

After the property owner of the item initiates the transfer operation, the warehousing party may further confirm whether the item to be transferred exists, and confirm, if the item exists, whether the item is still stored in the corresponding location. If the foregoing information is consistent with that recorded on the blockchain network, the warehousing party may confirm that there is no error, thereby completing the item transfer operation.

In addition, after the item transfer is completed, inventory party information of the item in the blockchain network may further be changed. If the item is transferred for the first time, the inventory party of the item is the property owner of the item. After the transfer is completed, the inventory party of the item needs to be changed to the transferee of the item.

If the item has been transferred a plurality of times, or the property owner of the item is not the inventory party of the item, the inventory party of the item is inconsistent with the property owner of the item. In this case, an item transfer record or an item purchase contract may be used to prove that the property owner of the item obtains the item legally. In this case, the inventory party information does not need to be changed.

In this method, the warehousing party reconfirms the information of the item to be transferred, and the warehousing party acts as a supervisory institution, which improves security and credibility of the transaction of the item on the blockchain network.

In an embodiment, before the changing property owner information corresponding to the property owner field on the blockchain warehouse receipt to the transferee information, the method may further include: querying the blockchain network for state information corresponding to the transfer warehouse receipt ID; and determining whether the state information is indicative of a tradable state, to obtain a first determination result; and the changing property owner information corresponding to the property owner field on the blockchain warehouse receipt to the transferee information may include: changing the property owner information corresponding to the property owner field on the blockchain warehouse receipt to the transferee information when the first determination result indicates that the state information is indicative of the tradable state.

Mortgage generally means that a mortgagor and a creditor reach an agreement in writing, not to transfer possession of a mortgaged property and use the property as a guarantee for the creditor. When the debtor fails to perform the debt, the creditor shall have the right to obtain priority in repayment at the price of the property or the auction or sale of the property in accordance with the law.

Pledge generally means that a debtor or a third party transfers possession of a property to a creditor, and the creditor holds the property as a guarantee for the debtor or the third party to perform payment or performance obligations. When this obligation is fulfilled, the pledged property needs to be returned. When the debtor fails to perform the obligation, the creditor has the right to discount or auction the pledged property in accordance with the law, and is given priority to the payment of the proceeds. The pledge is divided into two types: movable property pledge and rights pledge. The rights that may be pledged include: bills of exchange, checks, promissory notes, bonds, deposit receipts, warehouse receipts, bills of lading; legally transferable shares and stocks; and legally transferable trademark rights, patent rights, and property rights in copyrights.

As can be seen, a mortgage state and a pledge state both are states in which transaction is not allowed. A tradable state may be understood as that an item is not in a state of possession or guarantee, or an item is not in a pledge or mortgage state.

Because an item has a corresponding value, and may be used as a mortgage or a pledge for another purpose, the item in a mortgage or pledge state often cannot be traded or transferred. Therefore, the state of the item needs to be confirmed. Whether the item is under pledge or mortgage needs to queried in a third-party supervisory institution. To provide a more convenient query solution, the digital property rights platform provided in the embodiments of this specification may use the third-party supervisory institution as a node of the blockchain to facilitate the query of an item state.

To simplify item waste with the third-party supervisory institution caused by a plurality of queries of the item state, in this embodiment of this specification, the item state may be stored in a block, for example, stored in warehouse receipt information.

In an embodiment, after storing the updated blockchain warehouse receipt in the blockchain network, the method further includes: receiving a surveillance video viewing request submitted by the transferee; determining property owner information of an item corresponding to the surveillance video viewing request; determining a warehouse receipt ID corresponding to the surveillance video viewing request when the property owner information is consistent with the transferee information; and sending surveillance video information of the item corresponding to the warehouse receipt ID to a receiving address of the transferee. The foregoing method steps may be implemented in the form of a smart contract.

After the item is transferred, the property owner of the item becomes the transferee of the item. The property owner of the item may apply to invoke the video surveillance information of the item to control the situation of the item in real time.

When the user submits the surveillance video viewing request, because one user may be a property owner of a plurality of items, which item of a surveillance video to be viewed needs to be indicated in the viewing request. In this regard, two manners may be provided: manner 1: when the user views an item list thereof, the user clicks on an item to be viewed, and then initiates the surveillance video viewing request under the item; manner 2: the user directly initiates the surveillance video viewing request, and then selects an item from a plurality of items. In addition to the selection manners, a manner of filling in the warehouse receipt ID may be further included.

In this embodiment, it is assumed that only the property owner of the item can view the surveillance video of the item. In other embodiments, the warehousing party of the item may also view the surveillance video of the item, and specific steps thereof are similar to that of this embodiment. In addition, the warehousing party of the item views the surveillance video of the item, to check the items stored by the warehousing party, thereby determining whether a storage location of the item is inconsistent with that in the video surveillance device.

In an embodiment, the sending surveillance video information of the item corresponding to the warehouse receipt ID to the receiving address of the transferee may include: determining a warehouse site of the item corresponding to the warehouse receipt ID, the warehouse site including a warehouse and a warehouse location; determining a video surveillance device installed at the warehouse site; retrieving, from the blockchain network, surveillance video information acquired by the video surveillance device; and sending the surveillance video information to the receiving address of the transferee.

In this embodiment, video surveillance information for an item is retrieved according to a warehouse receipt ID. The warehouse receipt ID is used as a globally unique identifier, and the item to be viewed may be determined according to the warehouse receipt ID. The blockchain warehouse receipt corresponding to the warehouse receipt ID is queried on the blockchain, the warehouse site of the item is searched from the warehouse receipt information, and then a mapping relationship between the warehouse site and the video surveillance device is queried to find a number of the video surveillance device corresponding to the warehouse site, to further retrieve the video surveillance information corresponding to the video surveillance device from a node of the blockchain network. The video surveillance information is then sent to the receiving address of the transferee. The receiving address may be an information receiving address filled in when the transferee registers on the blockchain.

In an embodiment, after the changing property owner information corresponding to the property owner field on the blockchain warehouse receipt to the transferee information, the method may further include: adding property owner update information to the blockchain warehouse receipt, the property owner update information including an update time, the property owner information before updating, and the property owner information after the updating.

In this embodiment, for each operation of the item (the blockchain warehouse receipt), the operating user ID and the operation behavior are automatically recorded on the chain to facilitate information tracing. For each operation, an operation time and a corresponding change before and after the operation are recorded. When an operation is the change of the property owner information, the recorded information may include: an update time, the property owner information before the change and the property owner information after the change, and may further include the operating user ID. For example, if a user A transfers an item to a user B, it may be recorded that a user A initiates an item transfer operation, and the property owner information is changed from the user A to the user B.

In an embodiment, after receiving the confirmation information from the transferee, the method may further include: obtaining an updated contract attachment for the blockchain warehouse receipt by using a link address corresponding to a contract field in the blockchain warehouse receipt; identifying a contract number of the contract attachment from the contract attachment by invoking a third smart contract; and adding the contract number to the blockchain warehouse receipt.

The display content corresponding to the contract field is generally a contract in the form of an attachment. The user clicks on the contract attachment to jump to the corresponding link address to read the detailed information of the contract. In this embodiment, the contract number is identified from the link address of the contract attachment by using the smart contract, and the contract number is added to the blockchain warehouse receipt. The user may search the corresponding information in the blockchain according to the contract number. In this embodiment, the contract information is stored by using the blockchain, which can improve authenticity of the contract information.

Corresponding to the above embodiment, the method may further include: identifying subject matter information and contract party information from the contract attachment; and uploading the contract number, the subject matter information, and the contract party information to the blockchain network for consensus processing and storage.

In this embodiment, the subject matter information and the contract party information may be further identified from the contract attachment, and may be stored on the block after consensus of each consensus node of the blockchain together with the contract number.

In an embodiment, the method may further include: obtaining warehouse transfer operation information for the blockchain warehouse receipt and submitted by a warehousing party; determining updated warehouse site information of goods corresponding to the blockchain warehouse receipt based on the warehouse transfer operation information by invoking a fourth smart contract; and updating the warehouse site information to a corresponding field on the blockchain warehouse receipt.

The warehouse transfer is an operation of transferring an item in a warehouse from one location to another to improve utilization of the warehouse. After the location information of the item is moved, the warehouse location information in the blockchain warehouse receipt needs to be updated. For example, the smart contract may be used to extract the updated warehouse location information.

The warehouse transfer operation information may be text information or video information.

In an embodiment, when the warehousing party corresponds to an off-chain node, the obtaining warehouse transfer operation information for the blockchain warehouse receipt and submitted by the warehousing party may include: obtaining, by using an oracle mechanism, the warehouse transfer operation information for the blockchain warehouse receipt and submitted by the warehousing party, the warehouse transfer operation information being encrypted by using the fourth smart contract or a public key of the warehousing party.

In an embodiment, the method may further include: obtaining video information corresponding to the encrypted warehouse transfer operation information by invoking a fifth smart contract, where the video information may be included in the warehouse transfer operation information, or may be directly obtained by using the smart contract; obtaining a digital signature of the video information, where the digital signature may be processed in an encrypted form; verifying whether the digital signature is a digital signature of a designated video surveillance device, the designated video surveillance device being a video surveillance device installed at a warehouse site corresponding to the warehouse transfer operation information; and after verification succeeds, which indicates that the video information is credible, storing the video information in the blockchain network.

Risk prompt information for the video information may be generated if the verification on the digital signature of the video information fails, the risk prompt information being used for prompting security checking on the designated video surveillance device. If the verification fails, it indicates that the video information is not uploaded or acquired by a credible device, and may be tampered with or counterfeited. Therefore, it is necessary to check whether the corresponding video surveillance device has a security risk.

Figure 6:
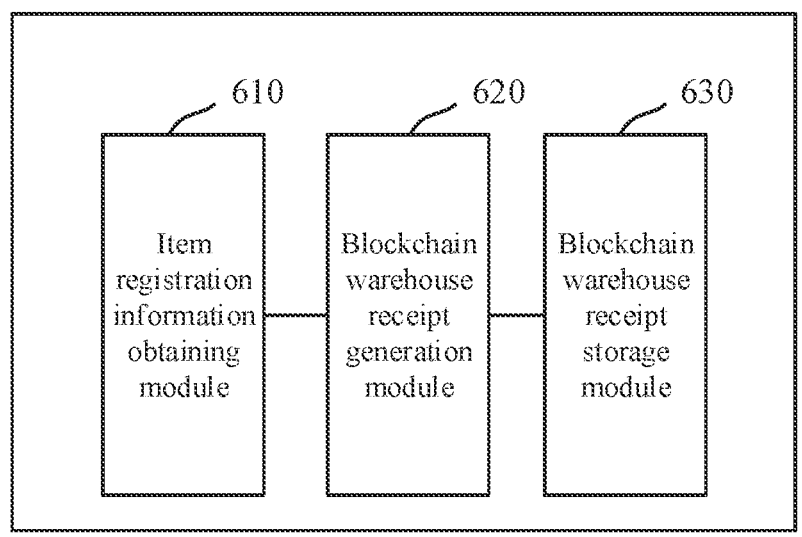
FIG. 6 is a schematic diagram of an apparatus for generating a blockchain warehouse receipt according to an embodiment.

FIG. 6 is a schematic diagram of an apparatus for generating a blockchain warehouse receipt according to an embodiment of this specification. For example, the apparatus corresponds to the method illustrated in FIG. 1. As shown in FIG. 6, the apparatus may include: an item registration information obtaining module 610, configured to obtain item registration information provided by a first user; a blockchain warehouse receipt generation module 620, configured to generate a blockchain warehouse receipt including basic type fields according to the item registration information by invoking a first smart contract, the basic type fields including at least a warehouse receipt type field, a warehouse receipt ID field, a generation time field, a state field, a category field, a property owner field, a quantity field, and a weight field; and a blockchain warehouse receipt storage module 630, configured to store the blockchain warehouse receipt in a blockchain network.

The basic type fields may further include at least one of an inventory party field and a warehousing party field.

The blockchain warehouse receipt may further include at least one of a logistics type field, a contract type field, a warehouse location field, and a warehouse replenishment field.

The contract type field may include at least one of a purchase contract field, a purchase invoice field, and a commodity inspection report field.

The logistics type field may include at least one of a transport mode field, a vehicle and vessel number field, a driver name field, a driver ID field, an ID number field, and an arrival time field.

The item registration information may include at least one of warehouse receipt type information, a warehouse receipt ID, state information, category information, property owner information, quantity information, and weight information.

In an embodiment, the apparatus may further include: an authenticity verification module, configured to perform authenticity verification on the item registration information; and the blockchain warehouse receipt generation module is configured to generate the blockchain warehouse receipt according to the item registration information after the authenticity verification succeeds.

In an embodiment, the authenticity verification module may include: an inventory proof information obtaining unit, configured to obtain inventory proof information uploaded by the first user; an inventory party information determining unit, configured to determine inventory party information according to the inventory proof information; a basic inventory information determining unit, configured to determine basic inventory information according to the inventory proof information; and a judging unit, configured to determine whether the basic inventory information is consistent with basic item information, and whether the inventory party information is consistent with the property owner information, the basic item information including the category information, the weight information, and the quantity information, and the basic inventory information including inventory category information, inventory weight information, and inventory quantity information.

In an embodiment, the basic inventory information determining unit may be specifically configured to: identify inventory location information included in the inventory proof information; determine a video surveillance device corresponding to the inventory location information; retrieve video information acquired by the video surveillance device; and determine the basic inventory information according to the video information.

In an embodiment, the blockchain warehouse receipt further includes traceability information, the traceability information is used for recording use process information of the blockchain warehouse receipt, and the use process information includes at least one of generation, cancellation, pledge, and transfer.

In an embodiment, the traceability information may be displayed in a barcode.

Figure 7:
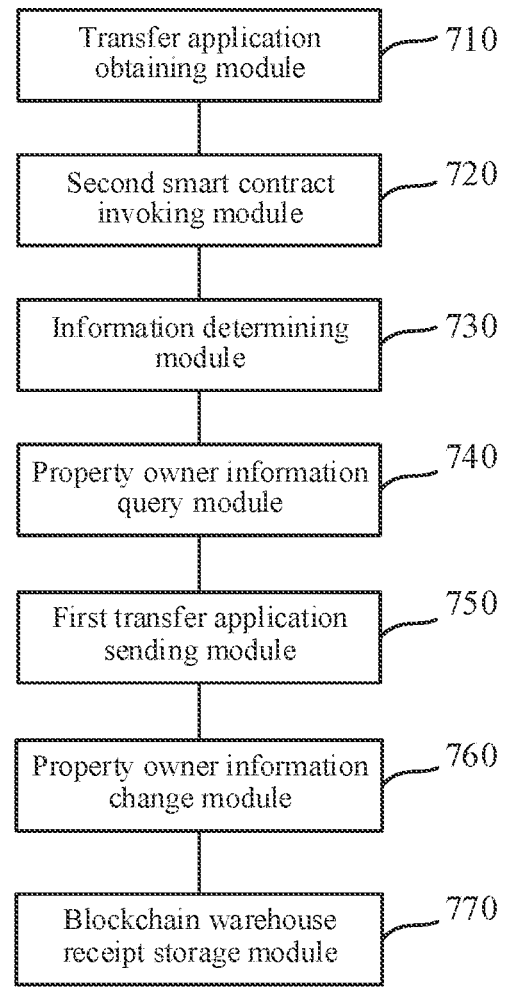
FIG. 7 is a schematic diagram of an apparatus for updating a blockchain warehouse receipt according to an embodiment.

FIG. 7 is a schematic diagram of an apparatus for updating a blockchain warehouse receipt according to an embodiment of this specification. For example, the apparatus corresponds to the method illustrated in FIG. 4. As shown in FIG. 7, the apparatus may include: a transfer application obtaining module 710, configured to obtain a transfer application for the blockchain warehouse receipt; a second smart contract invoking module 720, configured to invoke a second smart contract according to the transfer application; an information determining module 730, configured to determine a transfer warehouse receipt ID, transferor information, and transferee information; a property owner information query module 740, configured to query a blockchain network for property owner information corresponding to the transfer warehouse receipt ID; a first transfer application sending module 750, configured to send the transfer application to a transferee corresponding to the transferee information when the property owner information is consistent with the transferor information; a property owner information change module 760, configured to change property owner information corresponding to a property owner field on the blockchain warehouse receipt to the transferee information after confirmation information from the transferee is received; and a blockchain warehouse receipt storage module 770, configured to store an updated blockchain warehouse receipt in the blockchain network.

In an embodiment, the apparatus may further include: a warehousing party information query module, configured to query the blockchain network for warehousing party information corresponding to the transfer warehouse receipt ID; a second transfer application sending module, configured to send the transfer application to a warehousing party corresponding to the warehousing party information; and the property owner information change module being configured to change the property owner information corresponding to the property owner field on the blockchain warehouse receipt to the transferee information after confirmation information from the warehousing party is received, the confirmation information being confirmation information of a storage location of an item corresponding to the transfer warehouse receipt ID.

In an embodiment, before the changing property owner information corresponding to a property owner field on the blockchain warehouse receipt to the transferee information, the apparatus may further include: a state information query module, configured to query the blockchain network for state information corresponding to the transfer warehouse receipt ID; a first result judging module, configured to determine whether the state information is indicative of a tradable state, to obtain a first determination result; and the property owner information change module being configured to change the property owner information corresponding to the property owner field on the blockchain warehouse receipt to the transferee information when the first determination result indicates that the state information is indicative of the tradable state.

In an embodiment, the apparatus may further include: a property owner update information adding module, configured to add property owner update information to the blockchain warehouse receipt, the property owner update information including an update time, the property owner information before updating, and the property owner information after the updating.

In an embodiment, the apparatus may further include: a contract attachment obtaining module, configured to obtain an updated contract attachment for the blockchain warehouse receipt by using a link address corresponding to a contract field in the blockchain warehouse receipt; a contract number identification module, configured to identify a contract number of the contract attachment from the contract attachment by invoking a third smart contract; and a contract number storage module, configured to add the contract number to the blockchain warehouse receipt.

In an embodiment, the apparatus may further include: a subject matter information and contract party information identification module, configured to identify subject matter information and contract party information from the contract attachment; and a contract number, subject matter information, and contract party information storage module, configured to upload the contract number, the subject matter information, and the contract party information to the blockchain network for consensus processing and storage.

In an embodiment, the apparatus may further include: a warehouse transfer operation information obtaining module, configured to obtain warehouse transfer operation information for the blockchain warehouse receipt and submitted by a warehousing party; a warehouse site information determining module, configured to determine updated warehouse site information of goods corresponding to the blockchain warehouse receipt based on the warehouse transfer operation information by invoking a fourth smart contract; and a warehouse site information update module, configured to update the warehouse site information to a corresponding field on the blockchain warehouse receipt.

In an embodiment, the warehousing party is an off-chain node; and the warehouse transfer operation information obtaining module is configured to obtain, by using an oracle mechanism, the warehouse transfer operation information for the blockchain warehouse receipt and submitted by the warehousing party, the warehouse transfer operation information being encrypted by using the fourth smart contract or a public key of the warehousing party.

In an embodiment, the apparatus may further include: a video information obtaining module, configured to obtain video information corresponding to the encrypted warehouse transfer operation information by invoking a fifth smart contract; a digital signature obtaining module, configured to obtain a digital signature of the video information; a digital signature verification module, configured to verify whether the digital signature is a digital signature of a designated video surveillance device, the designated video surveillance device being a video surveillance device installed at a warehouse site corresponding to the warehouse transfer operation information; and a video information storage module, configured to store the video information in the blockchain network after verification succeeds.

In an embodiment, the apparatus may further include: a risk prompt information generation module, configured to generate risk prompt information for the video information if the verification on the digital signature of the video information fails, the risk prompt information being used for prompting security checking on the designated video surveillance device.

Figure 8:
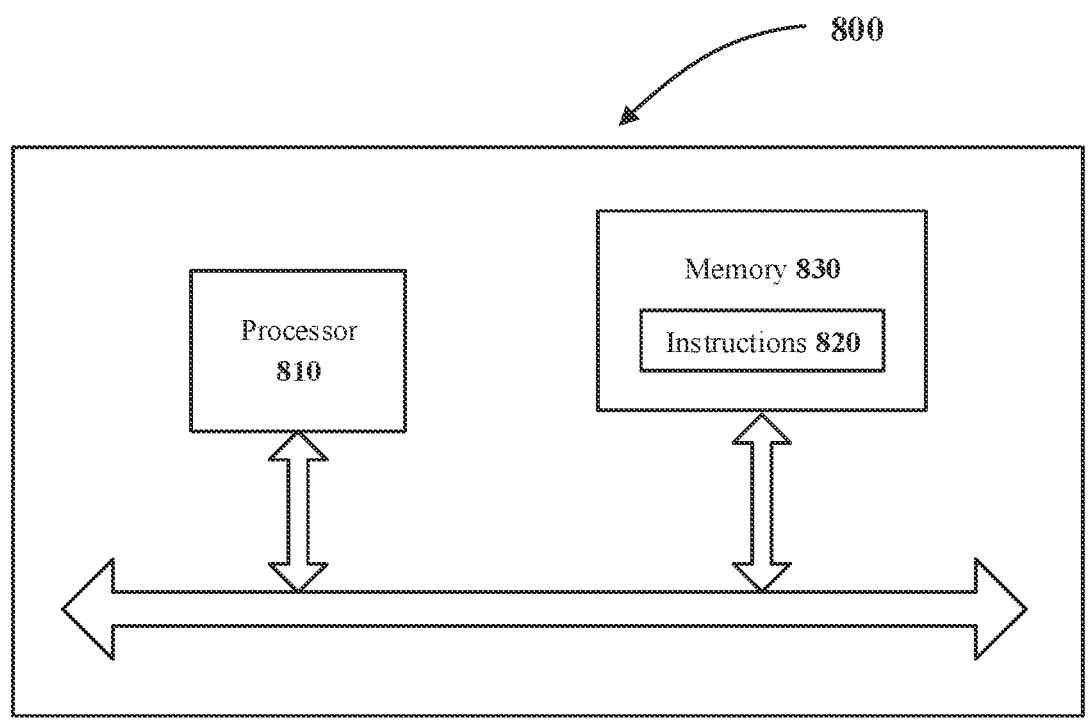
FIG. 8 is a schematic diagram of a device according to an embodiment.

FIG. 8 is a schematic diagram of a device 800 according to an embodiment of this specification. As shown in FIG. 8, the device 800 may include: at least one processor 810; and a memory 830 communicatively connected to the at least one processor 810 and storing instructions 820 executable by the at least one processor 810.

In an embodiment, the at least one processor 810 is configured to perform the above method for generating a blockchain warehouse receipt. For example, the at least one processor 810 is configured to: obtain item registration information provided by a first user; generate a blockchain warehouse receipt including basic type fields according to the item registration information by invoking a first smart contract, the basic type fields including at least one of a warehouse receipt type field, a warehouse receipt ID field, a generation time field, a state field, a category field, a property owner field, a quantity field, and a weight field; and store the blockchain warehouse receipt in a blockchain network.

In an embodiment, the at least one processor 810 is configured to perform the above method for updating a blockchain warehouse receipt. For example, the at least one processor 810 is configured to: obtain a transfer application for the blockchain warehouse receipt; and invoke a second smart contract according to the transfer application to perform the following operations: determining a transfer warehouse receipt ID, transferor information, and transferee information; querying a blockchain network for property owner information corresponding to the transfer warehouse receipt ID; sending the transfer application to a transferee corresponding to the transferee information when the property owner information is consistent with the transferor information; changing property owner information corresponding to a property owner field on the blockchain warehouse receipt to the transferee information after confirmation information from the transferee is received; and storing an updated blockchain warehouse receipt in the blockchain network.

Embodiments of this specification further provide a non-transitory computer readable medium having stored therein instructions executable by a processor of a device.

In an embodiment, the instructions are executed by the processor to cause the device perform the above method for generating a blockchain warehouse receipt, including, e.g., obtaining item registration information filled in by a first user; generating a blockchain warehouse receipt including basic type fields according to the item registration information by invoking a first smart contract, the basic type fields including at least one of a warehouse receipt type field, a warehouse receipt ID field, a generation time field, a state field, a category field, a property owner field, a quantity field, and a weight field; and storing the blockchain warehouse receipt in a blockchain network.

In an embodiment, the instructions are executed by the processor to cause the device perform the above method for updating a blockchain warehouse receipt, including, e.g., obtaining a transfer application for the blockchain warehouse receipt; and invoking a second smart contract according to the transfer application to perform the following operations: determining a transfer warehouse receipt ID, transferor information, and transferee information; querying a blockchain network for property owner information corresponding to the transfer warehouse receipt ID; sending the transfer application to a transferee corresponding to the transferee information when the property owner information is consistent with the transferor information; changing property owner information corresponding to a property owner field on the blockchain warehouse receipt to the transferee information after confirmation information from the transferee is received; and storing an updated blockchain warehouse receipt in the blockchain network.

With the development of technology, improvements of many method procedures can be implemented as direct improvements of hardware circuit structures. Designers program an improved method procedure to a hardware circuit, to obtain a corresponding hardware circuit structure. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

In some embodiments, a controller may be used to implement the above methods. The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. A memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function.

The system, the apparatus, the module or the unit described in the foregoing embodiments may be implemented by a computer chip or an entity, or implemented by a product having a certain function. An example implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

The embodiments are described with reference to the flowcharts and/or block diagrams. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable medium that can instruct a computer or any other programmable data processing device to work in a specific manner, so that the instructions stored in the computer readable medium generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer include, but are not limited to, a phase change memory (PRAM), a static random access memory (SRAM), a dynamic random access memory (DRAM), or other types of random access memory (RAM), a read-only memory (ROM), an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. Based on the definition in this specification, the computer-readable medium does not include transitory computer-readable media (transitory media), such as a modulated data signal and a carrier.

One or more embodiments of the present specification may be implemented using computer-executable instructions executed by a computer, for example, a program module. Generally, the program module includes a routine, a program, an object, a component, a data structure, and the like for executing a particular task or implementing a particular abstract data type. This application may also be practiced in distributed computing environments in which tasks are performed by remote processing devices that are connected by using a communication network. In a distributed computing environment, the program module may be located in both local and remote computer storage media including storage devices.

The foregoing descriptions are merely example embodiments of the present specification, and are not intended to limit the embodiments. For a person skilled in the art, various modifications and variations can be made to the embodiments. Any modification, equivalent replacement, or improvement made without departing from the spirit and principle of this application shall fall within the scope of the claims.

The invention claimed is:

1. A method for generating a blockchain warehouse receipt, comprising:
   obtaining item registration information provided by a first user;
   generating, by invoking a first smart contract, a blockchain warehouse receipt comprising basic type fields according to the item registration information, the basic type fields comprising a warehouse receipt type field, a warehouse receipt ID field, a generation time field, a state field, a category field, a property owner field, a quantity field, and a weight field;
   storing the blockchain warehouse receipt in a blockchain network;
   obtaining a transfer application for the blockchain warehouse receipt; and
   invoking a second smart contract according to the transfer application to perform:
      determining a transfer warehouse receipt ID, information of the first user, and information of a second user;
      querying the blockchain network for property owner information corresponding to the transfer warehouse receipt ID;
      electronically sending the transfer application to the second user when the property owner information is consistent with the information of the first user;
      changing property owner information corresponding to the property owner field on the blockchain warehouse receipt to the information of the second user after confirmation information from the second user is received; and
      storing an updated blockchain warehouse receipt in the blockchain network.

2. The method according to claim 1, wherein the basic type fields further comprise at least one of an inventory party field and a warehousing party field.

3. The method according to claim 1, wherein the blockchain warehouse receipt further comprises at least one of a logistics type field, a contract type field, a warehouse location field, and a warehouse replenishment field.

4. The method according to claim 3, wherein the contract type field comprises at least one of a purchase contract field, a purchase invoice field, and a commodity inspection report field.

5. The method according to claim 3, wherein the logistics type field comprises at least one of a transport mode field, a vehicle and vessel number field, a driver name field, a driver ID field, an ID number field, and an arrival time field.

6. The method according to claim 1, wherein the item registration information comprises warehouse receipt type information, a warehouse receipt ID, state information, category information, property owner information, quantity information, and weight information.

7. The method according to claim 1, wherein before the generating the blockchain warehouse receipt according to the item registration information, the method further comprises:
   performing authenticity verification on the item registration information; and
   the generating the blockchain warehouse receipt according to the item registration information comprises:
      generating the blockchain warehouse receipt according to the item registration information after the authenticity verification succeeds.

8. The method according to claim 7, wherein the performing authenticity verification on the item registration information comprises:
   obtaining inventory proof information uploaded by the first user;
   determining inventory party information according to the inventory proof information;
   determining basic inventory information according to the inventory proof information; and
   determining whether the basic inventory information is consistent with basic item information, and whether the inventory party information is consistent with the property owner information, the basic item information comprising category information, weight information, and quantity information, and the basic inventory information comprising inventory category information, inventory weight information, and inventory quantity information.

9. The method according to claim 8, wherein the determining basic inventory information according to the inventory proof information comprises:
   identifying inventory location information comprised in the inventory proof information;
   determining a video surveillance device corresponding to the inventory location information;
   retrieving video information acquired by the video surveillance device; and
   determining the basic inventory information according to the video information.

10. The method according to claim 1, wherein the blockchain warehouse receipt further comprises traceability information for recording use process information of the blockchain warehouse receipt, and the use process information comprises at least one of generation, cancellation, pledge, and transfer.

11. The method according to claim 10, further comprising displaying the traceability information in a barcode.

12. The method according to claim 1, wherein before the sending the transfer application to the second user, the method further comprises:
   querying the blockchain network for warehousing party information corresponding to the transfer warehouse receipt ID; and
   sending the transfer application to a warehousing party corresponding to the warehousing party information; and
   the changing property owner information corresponding to the property owner field on the blockchain warehouse receipt to the information of the second user comprises:
      changing the property owner information corresponding to the property owner field on the blockchain warehouse receipt to the information of the second user after confirmation information from the warehousing party is received, the confirmation information being confirmation information of a storage location of an item corresponding to the transfer warehouse receipt ID.

13. The method according to claim 1, wherein before the changing property owner information corresponding to the property owner field on the blockchain warehouse receipt to the information of the second user, the method further comprises:
    querying the blockchain network for state information corresponding to the transfer warehouse receipt ID; and
    determining whether the state information is indicative of a tradable state, to obtain a first determination result; and
    the changing property owner information corresponding to the property owner field on the blockchain warehouse receipt to the information of the second user comprises:
    changing the property owner information corresponding to the property owner field on the blockchain warehouse receipt to the information of the second user when the first determination result indicates that the state information is indicative of the tradable state.

14. The method according to claim 1, wherein after the changing property owner information corresponding to the property owner field on the blockchain warehouse receipt to the information of the second user, the method further comprises:
    adding property owner update information to the blockchain warehouse receipt, the property owner update information comprising an update time, the property owner information before updating, and the property owner information after the updating.

15. The method according to claim 1, wherein after receiving the confirmation information from the second user, the method further comprises:
    obtaining an updated contract attachment for the blockchain warehouse receipt by using a link address corresponding to a contract field in the blockchain warehouse receipt;
    identifying a contract number of the contract attachment from the contract attachment by invoking a third smart contract; and
    adding the contract number to the blockchain warehouse receipt.

16. The method according to claim 15, further comprising:
    identifying subject matter information and contract party information from the contract attachment; and
    uploading the contract number, the subject matter information, and the contract party information to the blockchain network for consensus processing and storage.

17. The method according to claim 1, further comprising:
    obtaining warehouse transfer operation information submitted by a warehousing party for the blockchain warehouse receipt;
    determining updated warehouse site information of an item corresponding to the blockchain warehouse receipt based on the warehouse transfer operation information by invoking a fourth smart contract; and
    updating a corresponding field on the blockchain warehouse receipt to the warehouse site information.

18. The method according to claim 17, wherein the warehousing party is an off-chain node; and the obtaining warehouse transfer operation information for the blockchain warehouse receipt comprises:
    obtaining, by using an oracle mechanism, the warehouse transfer operation information for the blockchain warehouse receipt, the warehouse transfer operation information being encrypted by using the fourth smart contract or a public key of the warehousing party.

19. The method according to claim 17, further comprising:
    obtaining video information corresponding to encrypted warehouse transfer operation information by invoking a fifth smart contract;
    obtaining a digital signature of the video information;
    verifying whether the digital signature is a digital signature of a designated video surveillance device, the designated video surveillance device being installed at a warehouse site corresponding to the warehouse transfer operation information; and
    storing the video information in the blockchain network after verification succeeds.

20. The method according to claim 19, further comprising:
    generating risk prompt information for the video information if the verification on the digital signature of the video information fails, the risk prompt information being configured to prompt security checking on the designated video surveillance device.

21. A device, comprising:
    a processor; and
    a memory storing instructions executable by the processor,
    wherein the processor is configured to:
    obtain item registration information provided by a first user;
    generate, by invoking a first smart contract, a blockchain warehouse receipt comprising basic type fields according to the item registration information, the basic type fields comprising a warehouse receipt type field, a warehouse receipt ID field, a generation time field, a state field, a category field, a property owner field, a quantity field, and a weight field;
    store the blockchain warehouse receipt in a blockchain network;
    obtain a transfer application for the blockchain warehouse receipt; and
    invoke a second smart contract according to the transfer application to perform:
        determining a transfer warehouse receipt ID, information of the first user, and information of a second user;
        querying the blockchain network for property owner information corresponding to the transfer warehouse receipt ID;
        electronically sending the transfer application to the second user when the property owner information is consistent with the information of the first user;
        changing property owner information corresponding to the property owner field on the blockchain warehouse receipt to the information of the second user after confirmation information from the second user is received; and
        storing an updated blockchain warehouse receipt in the blockchain network.

\* \* \* \* \*